United States Patent [19]

Dixon et al.

[11] Patent Number: 5,016,255
[45] Date of Patent: May 14, 1991

[54] ASYMMETRIC SPREAD SPECTRUM CORRELATOR

[75] Inventors: Robert C. Dixon, Palmer Lake; Jeffrey S. Vanderpool, Colorado Springs, both of Colo.

[73] Assignee: Omnipoint Data Company, Incorporated, Boston, Mass.

[21] App. No.: 389,914

[22] Filed: Aug. 7, 1989

[51] Int. Cl.⁵ .................................................. H04K 1/00
[52] U.S. Cl. .......................................................... 375/1
[58] Field of Search ................................. 375/1; 380/34

[56] References Cited

U.S. PATENT DOCUMENTS

| | | | |
|---|---|---|---|
| 3,978,436 | 8/1976 | Alig et al. | 29/25.35 |
| 4,021,898 | 5/1977 | Willis et al. | 29/25.35 |
| 4,051,448 | 9/1977 | Goussot | 29/25.35 |
| 4,100,498 | 7/1978 | Alsup et al. | 375/1 |
| 4,131,484 | 12/1978 | Caruso et al. | 29/25.35 |
| 4,163,944 | 8/1979 | Chambers et al. | 375/1 |
| 4,217,563 | 8/1980 | Vale | 29/25.35 |
| 4,247,942 | 1/1981 | Hauer | 375/25 |
| 4,314,393 | 2/1982 | Wakatsuki et al. | 29/25.35 |
| 4,418,393 | 11/1983 | Zscheile, Jr. | 375/1 |
| 4,432,089 | 2/1984 | Wurzburg et al. | 370/110.1 |
| 4,445,256 | 5/1984 | Huguenin et al. | 29/25.35 |
| 4,456,793 | 6/1984 | Baker | 379/56 |
| 4,484,028 | 11/1984 | Kelley et al. | 379/94 |
| 4,517,679 | 5/1985 | Clark et al. | 375/1 |
| 4,525,835 | 6/1985 | Vance et al. | 370/29 |
| 4,550,414 | 10/1985 | Guinon et al. | 375/1 |
| 4,561,089 | 12/1985 | Rouse et al. | 375/1 |
| 4,562,370 | 12/1985 | von Dach | 29/25.35 |
| 4,567,588 | 1/1986 | Jerrim | 375/1 |
| 4,569,062 | 2/1986 | Dellande et al. | 375/117 |
| 4,601,047 | 7/1986 | Horwitz et al. | 375/1 |
| 4,606,039 | 8/1986 | Nicolas et al. | 375/1 |
| 4,621,365 | 10/1986 | Chiv | 375/1 |
| 4,622,854 | 11/1986 | Locke et al. | 29/25.35 |
| 4,642,505 | 2/1987 | Arvanitis | 29/25.35 |
| 4,647,863 | 3/1987 | Skudera et al. | 375/1 |
| 4,649,549 | 3/1987 | Halpern et al. | 375/1 |
| 4,653,069 | 3/1987 | Roeder | 375/1 |
| 4,660,164 | 4/1987 | Leibowitz | 364/728 |
| 4,672,254 | 6/1987 | Dolat et al. | 29/25.35 |
| 4,672,658 | 6/1987 | Kavehrad et al. | 375/1 |
| 4,680,785 | 7/1987 | Akiyama et al. | 379/57 |
| 4,691,326 | 9/1987 | Tsuchiya | 375/1 |
| 4,701,904 | 10/1987 | Darcie | 370/3 |
| 4,703,474 | 10/1987 | Foschini et al. | 375/1 |
| 4,707,839 | 11/1987 | Andren et al. | 375/1 |
| 4,718,080 | 1/1988 | Serrano et al. | 379/59 |
| 4,724,435 | 2/1988 | Moses et al. | 375/1 |
| 4,745,378 | 5/1988 | Niitsuma et al. | 333/196 |
| 4,754,473 | 6/1988 | Edwards | 379/57 |
| 4,759,034 | 7/1988 | Nagazumi | 375/1 |
| 4,759,078 | 7/1988 | Schiller | 455/49 |
| 4,769,812 | 9/1988 | Shimizu | 455/49 |
| 4,804,938 | 2/1989 | Rouse et al. | 375/1 |
| 4,805,208 | 2/1989 | Schwartz | 370/67 |
| 4,807,222 | 2/1989 | Amitay | 370/4 |
| 4,815,106 | 3/1989 | Propp et al. | 375/36 |
| 4,833,702 | 5/1989 | Shitara et al. | 379/60 |
| 4,837,802 | 6/1989 | Higashiyama et al. | 379/62 |
| 4,860,307 | 8/1989 | Nakayama | 375/1 |
| 4,894,842 | 1/1990 | Broekhoven et al. | 375/1 |

OTHER PUBLICATIONS

Eschenbach, Proceedings of the IEEE, pp. 34.5-1 to 3 (1982).
Freret, Proceedings of the IEEE, pp. 244-248 (1980).
Freret et al., Conf. Rec. NTC80, vol. 4, pp. 69.7.1 to 4 (1980).
Kavehrad et al., AT&T Technical Journal, vol. 64, No. 8, pp. 1927-1965 (1985).
Kavehrad et al., IEEE Communications Magazine, vol. 25, No. 6, pp. 32-40.
Spread Spectrum Systems, by Robert C. Dixon, pp. 230-232.

Primary Examiner—Salvatore Cangialosi
Attorney, Agent, or Firm—David B. Newman, Jr. & Associates

[57] ABSTRACT

An apparatus for decoding a received spread spectrum signal having a data signal modulated with a pseudo-noise code and transmitted as an RF spread spectrum signal. A reference-sequence-storage device holds a reference-pseudo-noise signal, and a receive-sequence storage device holds a received spread spectrum signal. A chip comparator adds each chip of the received spread spectrum signal by each respective chip of the pseudo-noise signal, thereby generating a plurality of chip comparison signals. A summer adds the plurality of chip comparison signals, generating a correlation signal. The comparator compares the correlation signal to a statistically predetermined threshold level, and generates a first data-symbol signal.

16 Claims, 5 Drawing Sheets

ASYMMETRIC SPREAD SPECTRUM CORRELATOR

BACKGROUND OF THE INVENTION

This invention relates to spread spectrum communications, and more particularly to a non-code synchronous spread spectrum communications system.

DESCRIPTION OF THE PRIOR ART

A spread spectrum system is one in which the signal is spread over a band much wider than the maximum bandwidth required to transmit the information being sent. Techniques for direct sequence spread spectrum modulation have been developed for several years to ensure secure communications. Modulation is achieved by mixing the information to be sent with a periodic pseudo-noise (PN) code. The result is a sin(X)/X signal with a very wide bandwidth, as compared to the information, and low spectral density. This spectral density reduces the signal's sensitivity to in-band interference and jamming, as well as reducing interference with other radio sensitive equipment. Among the other advantages inherent to a spread spectrum system are selective addressing capabilities, code division multiplexing for multiple access, and highly accurate ranging capabilities.

Due to the encoded nature of the signal, demodulation is a more involved process than with traditional communications systems, and involves a reference code, identical to that transmitted, synchronized to the received code. The difficulty with this process is that there is no indication of the degree of non-synchronization between received and reference codes until a very high degree of synchronization is achieved. Additionally, mismatches between transmit and receive oscillators used to generate PN codes tend to cause drift in the synchronization between transmitter and receiver.

A prior art communications system using two pseudo-random waveforms and two correlators for designating a MARK and a SPACE, is disclosed in U.S. Pat. No. 4,247,942, to Hauer, issued Jan. 27, 1981, which is incorporated herein by reference. Hauer discloses in a communication system, a first delay line having multiple spaced taps for supplying successive input pulses to the delay line. In response to each input impulse, variously delayed pulses appear at the taps of the delay line, which are used to generate pulses representing a MARK or a SPACE. His disclosure includes synchronous detectors, and means for supplying the carrier-transmitted pulses to the detectors.

None of the prior art teaches or suggests an apparatus having an acquisition time of a spread spectrum signal equal to the time duration of one data bit on every data bit, nor using one correlator.

OBJECTS AND SUMMARY OF THE INVENTION

An object of the invention is to provide an apparatus for acquiring a spread spectrum signal with only one correlator, which is direct, inexpensive and simple.

Another object of the invention is to provide an apparatus for detecting a first data symbol and if no first data symbol is detected, declaring the signal as a second data symbol, such determination being based on the probability of being incorrect. In this manner a data bit will be declared with an asymmetric level of confidence as to its actual value using only one correlator.

Another object of the invention is to provide an apparatus for acquiring a spread spectrum signal without the use of a synchronous reference code.

An additional object of the invention is to provide an apparatus which will acquire a spread spectrum signal on each data bit received at the rate the data are transmitted with no time loss due to code synchronization, and without use of any code synchronization preambles.

According to the present invention, as embodied and broadly described herein, an apparatus for decoding a received spread spectrum signal, which includes a data signal modulated with a PN code, is provided, comprising threshold setting means, reference-sequence-storage means, receive-sequence-storage means, correlating means, and correlation-comparison means. The correlating means may include chip-comparison means and summer means.

The threshold setting means may set the threshold for a match equal to or less than the total number of chips per code being acquired. The threshold setting means may analyze the pattern and application of the data to be transmitted and/or received using the spread spectrum signal, the noise environment, and the amount of error correction used with the data signal. In response to this analysis, the threshold setting means generates a threshold level. The threshold setting means may be used to predetermine a threshold level for a specific device, application, or operating environment, or it may be coupled to the spread spectrum receiver and used to set and adjust the threshold level as the application or operating environment changes.

The reference-sequence-storage means stores a pseudo-noise signal, and the receive-sequence-storage means stores the received spread spectrum signal. The chip-comparison means is coupled to the reference-sequence-storage means and the receive-sequence-storage means. In response to the received spread spectrum signal, the chip-comparison means compares each chip of the received spread spectrum signal with each respective chip of the reference pseudo-noise signal and thereby generates a plurality of chip-comparison signals. The summer means is coupled to the chip-comparison means. In response to the plurality of chip-comparison signals from the chip-comparison means, the summer means adds the plurality of chip-comparison signals and thereby generates a correlation signal.

The correlation-comparison means is coupled to the summer means. The correlation-comparison means includes the threshold level of the threshold setting means. In response to the correlation signal being greater than the threshold level, the correlation-comparison means generates a data-symbol signal. Statistically, the accuracy of detection depends in part upon threshold setting as a function of several variables: The total number of matched chips to the total number of chips on a per data symbol basis, the error rate and the degree of forward error correction on the input signal, and whether the data stream to be processed is continuous, cyclically repetitive, patterned, episodic, pulsed or random.

Additional objects and advantages of the invention will be set forth in part in the description which follows, and in part will be obvious from the description, or may be learned by practice of the invention.

BRIEF DESCRIPTION OF THE DRAWINGS

The accompanying drawings, which are incorporated in and constitute a part of the specification, illustrate preferred embodiments of the invention, and together with the description serve to explain the principles of the invention.

DESCRIPTION OF THE PREFERRED EMBODIMENTS

Reference will now be made in detail to the present preferred embodiments of the invention, examples of which are illustrated in the accompanying drawings.

Figure 1:
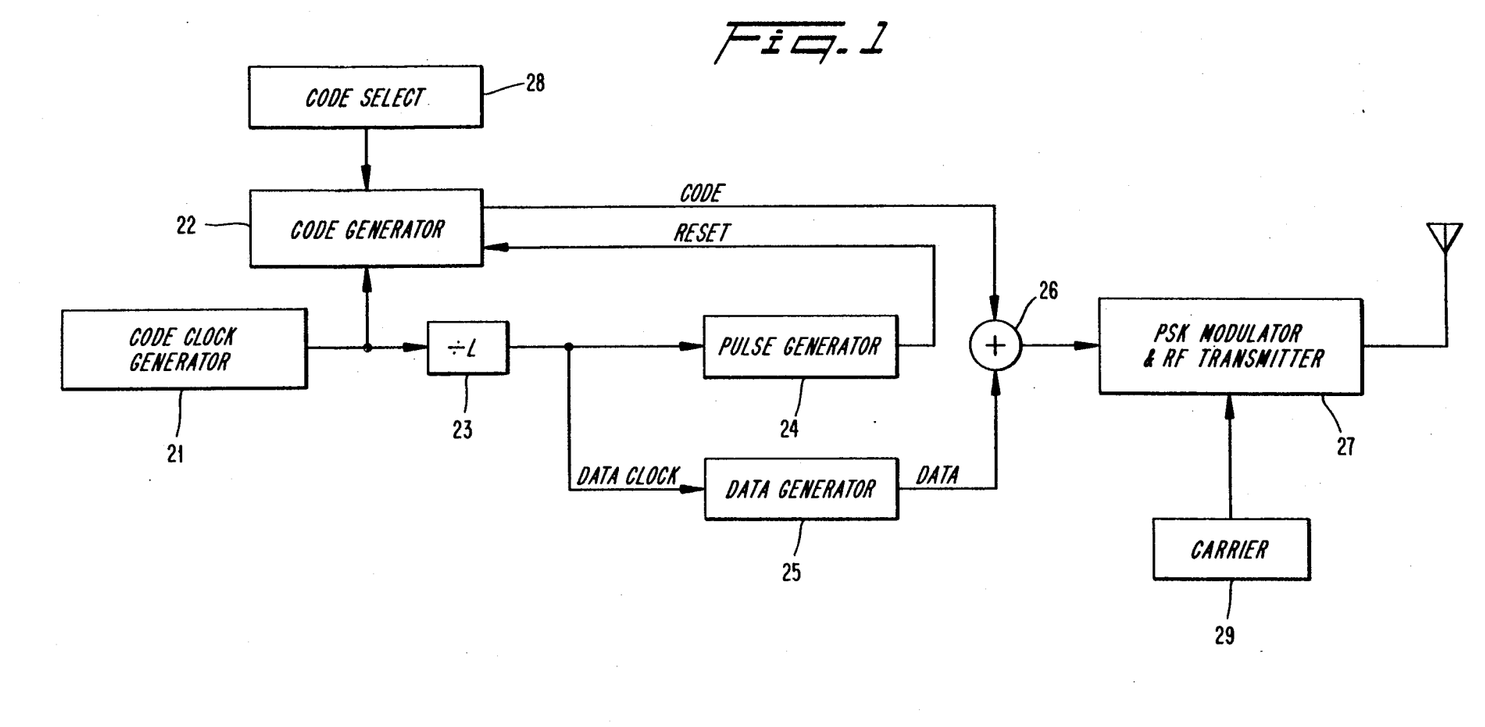
FIG. 1 is a block diagram of an embodiment of a transmitter according to the present invention.

The present invention includes an apparatus for transmitting and decoding a received spread spectrum signal having a data signal modulated with a PN code to produce a spread spectrum signal. As illustrated in FIG. 1, a transmitter is shown including a code clock generator 21, code selector 28, code generator 22, code clock divider 23, pulse generator 24, data generator 25, modulo 2 adder 26, carrier 29, and phase shift keyed (PSK) modulator and RF transmitter 27. The code clock generator 21 generates a clock signal which is fed to the code generator 22 and to the clock divider 23. Using clock divider 23, the code and the data of the transmitter 27 are synchronized, with the code clock frequency being a multiple equal to the code length, L, of the data clock frequency thereby allowing one data bit per PN code sequence of length L. The data clock signal from code clock divider 23 is fed to the pulse generator 24 and to the data generator 25. The data generator 25 is the source of the data signal to be transmitted over the communications system. The output signal of the pulse generator 24 is fed to the code generator 22 which thereby generates a PN code chosen by code selector 28. The PN code, which is recursive, is then fed out of the code generator 22 and modulo 2 added with modulo 2 adder 26 to the data fed from the data generator 25. The output of modulo 2 adder 26 is the data signal modulated with the PN code, which is phase shift key modulated with a carrier 29 in PSK modulator and RF transmitter 27.

Figure 2:
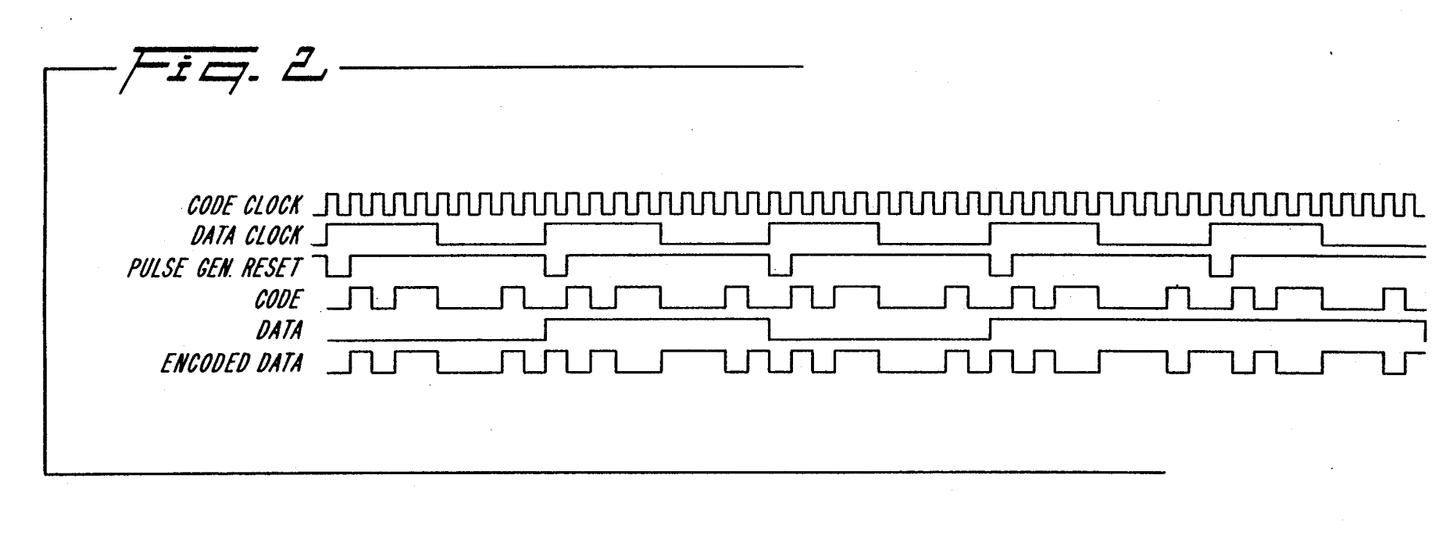
FIG. 2 is a timing diagram for a particular signal according to the present invention; based receiver according to the present invention.

An example of the timing of the code and clock signals of FIG. 1 is shown in FIG. 2. The timing diagram illustrates a code clock signal, a data clock signal which is the code clock signal divided by the length of code, L, pulse generator reset signal, and the code signal, the data signal, and the encoded data signal. The code signal, when modulo 2 added with the data signal, produces the encoded data signal, and when modulated by an RF carrier produces a spread spectrum signal. The transmitted spread spectrum signal may be received by the receiver illustrated in FIG. 3.

Figure 3:
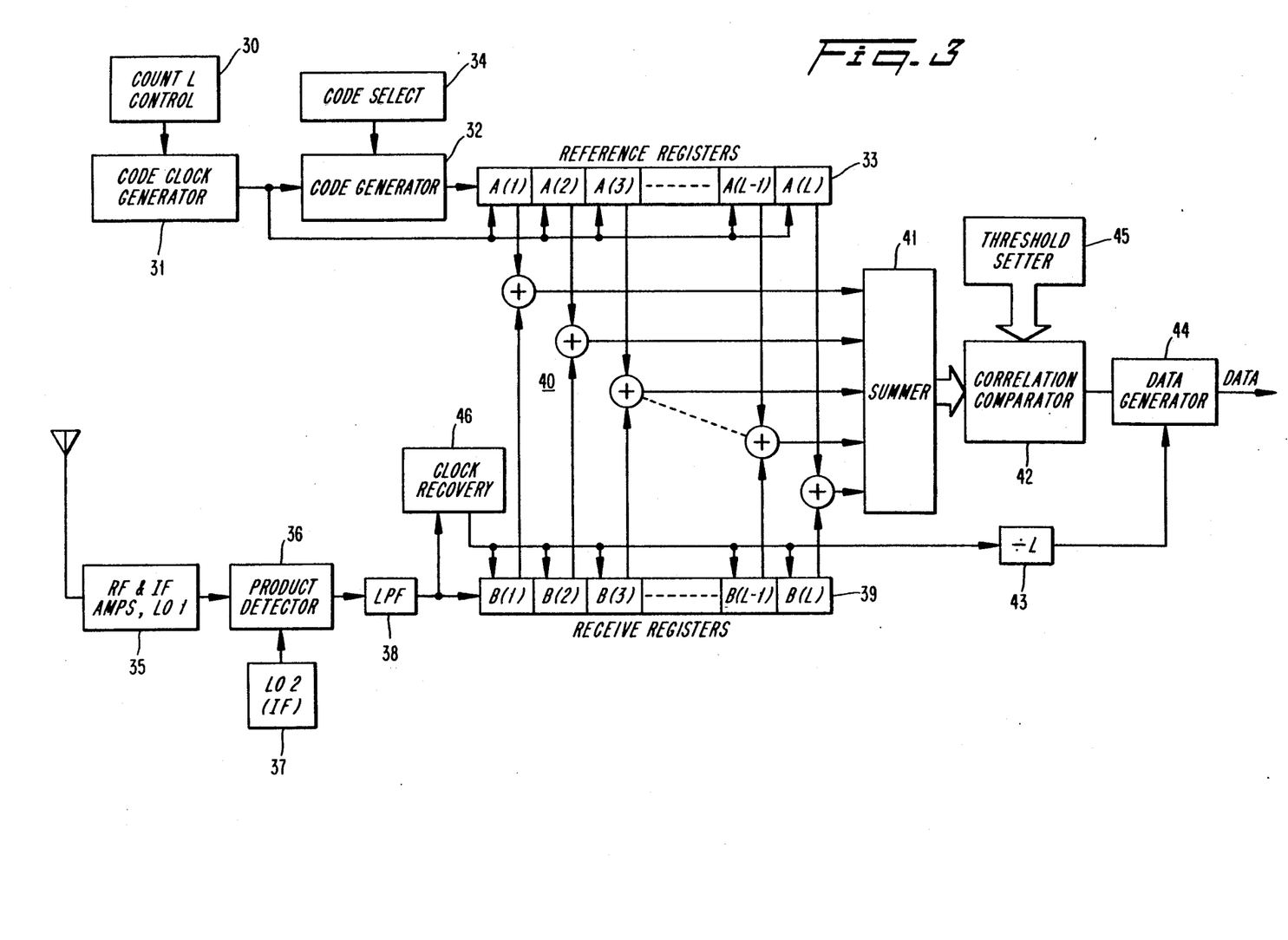

While FIG. 3 illustrates a particular embodiment of the asymmetric spread spectrum correlator of the present invention, the present invention in general includes an apparatus for decoding a received spread spectrum signal which includes a data signal modulated with a PN code. The apparatus comprises threshold setting means, reference-sequence-storage means, receive-sequence-storage means, correlating means, and correlation-comparison means. The correlating means may include chip-comparison means and summer means. With reference to FIG. 3, the reference-sequence-storage means may be embodied as reference registers 33, the receive-sequence-storage means may be embodied as receive-sequence-storage registers 39, the chip-comparison means may be embodied as comparators 40, the summer means may be embodied as summer 41, and the correlation-comparison means may be embodied as correlation comparator 42. The threshold setting means may be embodied as threshold setter 45. The comparators 40 are coupled to the reference registers 33 and the receive registers 39. Summer 41 is coupled to comparators 40. The correlation comparator 42 is coupled to summer 41, threshold setter 45, and data generator 44.

In the exemplary arrangement shown in FIG. 3, a count control 30 may be coupled to a code clock generator 31 which is connected to a code generator 32 and reference registers 33. The code generator 32 is also connected to the reference registers 33. The count control 3 controls the length of the particular pseudo-noise signal chosen by code selector 34 to be detected by the receiver, and outputs signals to the code clock generator 31 which causes the code generator 32 to output a code of length L to reference registers 33. Count control 30 triggers code clock generator 31 which thereby triggers code generator 32 and reference registers 33. Code generator 32 outputs the particular pseudo-noise signal to reference registers 33 as determined by code selection circuit 34. The code selection circuit 34 can provide signals to the code generator which enable it to scan through a plurality of possible pseudo noise codes. In operation, a single code can be loaded into the reference registers 33 or, in a scanning mode, the reference registers 33 can be periodically loaded with constantly varying codes until a match to a received code occurs.

Also shown in FIG. 3 is RF and IF amplifiers 35, coupled to a product detector 36 which is coupled to a local oscillator 37 and a low pass filter 38. The low pass filter 38 is coupled to receive registers 39 and clock recovery circuit 46.

In operation, a received baseband spread spectrum signal, which includes a data signal modulated with a PN code, is stored in receive registers 39 and a pseudo-noise reference baseband signal is stored in reference registers 33. Each chip of the received spread spectrum signal is modulo 2 added with each respective chip of the reference pseudo-noise signal by modulo 2 comparators 40. This modulo 2 addition of the two signals generates a plurality of chip-comparison signals which are transferred from modulo 2 comparators 40 to summer 41. The summer 41 adds the plurality of signals to generate a correlation signal.

The correlation comparator 42 is coupled to the summer 41. The correlation comparator 42 has a threshold level determined by threshold setter 45. In response to the correlation signal being greater than the threshold level, the correlation comparator 42 generates a first data-symbol-correlation signal. If the correlation signal is not greater than the threshold level, then a second data symbol is output. This is considered an asymmetric detector since the probability of accurately identifying the first data symbol is generally different than the probability of accurately identifying the second data symbol.

In the system provided by the present invention, a pseudo-noise signal may include a PN code segment having L bits produced with a clock rate equivalent to $L \times R_d$, where $R_d$ is the clock rate of the data to be modulated. For example, if the data rate to be transmitted is 100 kHz, and the code segment to be employed is 100 bits long, then the code rate is equivalent to $L \times R$, or $(100) \times (100 \text{ kHz}) = 10.0$ MHz. In the transmitter, the beginning of each code segment is then synchronously aligned with each data bit. If a first data symbol is to be transmitted, then the normal code segment is sent. If the information to be sent is a second data symbol, then the code segment is inverted and then transmitted. In the receiver, a reference code segment equivalent to the transmitter's is loaded into the reference register section of the correlator unit and held stationary.

The received spread spectrum signal is then clocked through the correlator and when a receive and a reference signal correlation score surpasses a particular set threshold level, then an output pulse is generated signifying a first data symbol. The threshold setter may, for example, determine that the application of the data is for voice at 64 kbps and that the noise environment is Gaussian. Because studies indicate that at this transmission rate and noise environment that an error rate of one in eight bits is tolerable to the human ear, the threshold for declaring a first data symbol might be set when a match occurs on ninety percent of the chips out of the total number of chips in a code of length L. As another example, the threshold setter may determine that the application of the data is for detecting a prolonged change in an otherwise steady state system, such as the occurrence of an alarm, or a drop in water pressure. For such prolonged state change applications, matching even fifty-five percent of the chips per code length for a relatively low number of consecutively identical data symbols would provide a very high confidence level that the state change had occurred.

A second preferred embodiment of the present invention may use analog devices such as surface-acoustic-wave (SAW) devices and charge coupled devices. The surface-acoustic-wave devices, as an example of analog devices, include reference-sequence-storage devices and receive-sequence-storage devices. The surface-acoustic-wave devices additionally may include the comparators 40 and the summers 41, and function as a complete self-contained correlator unit. Additionally, a plurality of sets of reference-sequence-storage devices may be constructed on one particular surface-acoustic-wave device along with the received registers to form a very compact means for decoding a plurality of pseudo-noise signals.

A delay line matched filter or SAW correlator is a passive device designed to recognize a specific sequence of code chips, as does a digital correlator, but accomplishes this through a correlation of phase shifts in an RF signal, rather than voltage levels at baseband, and can therefore avoid many of the problems inherent in a digital correlator, such as a high noise or interference/jamming environment.

Each delay element within the correlator has a delay equal to the period of the transmitted code clock such that each element corresponds to only one chip at any one time. As the received signal propagates down the delay line, the phase structure of each element is added in or out of phase with the propagated PN encoded wave, and the outputs of all the elements are then summed to arrive at a total correlation value. When all the phase shift structures of the elements match the phase shifts of the propagated wave, then the maximum sum and correlation is achieved.

In order to achieve the desired correlation, the correct reference code must be "loaded" onto the SAW device. The present discussion is for a BPSK device, however, the invention extends and includes any PSK such as MSK, QPSK, etc. Assuming a bi-phase shift keyed signal, phase reversals would occur at each one-/zero transition of the PN code. This is usually accomplished in one of two ways. The first is through a programmable correlator which can output all phases in each element. As illustratively shown in FIG. 4, for a bi-phase shift keyed device a count controller 91 controls a code clock generator 92 which sends L clock signals to a code generator 94 and reference registers 95. Code generator 94 then produces a unique code as determined by code selector 93 and loads it into reference registers 95. Once the code is stored in reference registers 95, the zero/one pattern is loaded into delay line correlator 96, with the contents of register A(2) connected to element T(2), and so on to element A(L). The correlator is then programmed (see, e.g., FIG. 5) so that all the outputs of the elements corresponding to a first phase are connected to summing device 98, and all outputs of the elements corresponding to a second phase are connected to summing device 99. In this example, the first data symbol is embodied as a first phase, and the second data symbol is embodied as a second phase.

In non-programmable devices, these phase shifts are programmed at the time of construction through transducers placed in each element to produce an elemental phase match and cannot be changed by the user. Thus, only one code sequence can be correlated. Inverted and non-inverted phase elements are then summed together just as in the programmable device.

Figure 4:
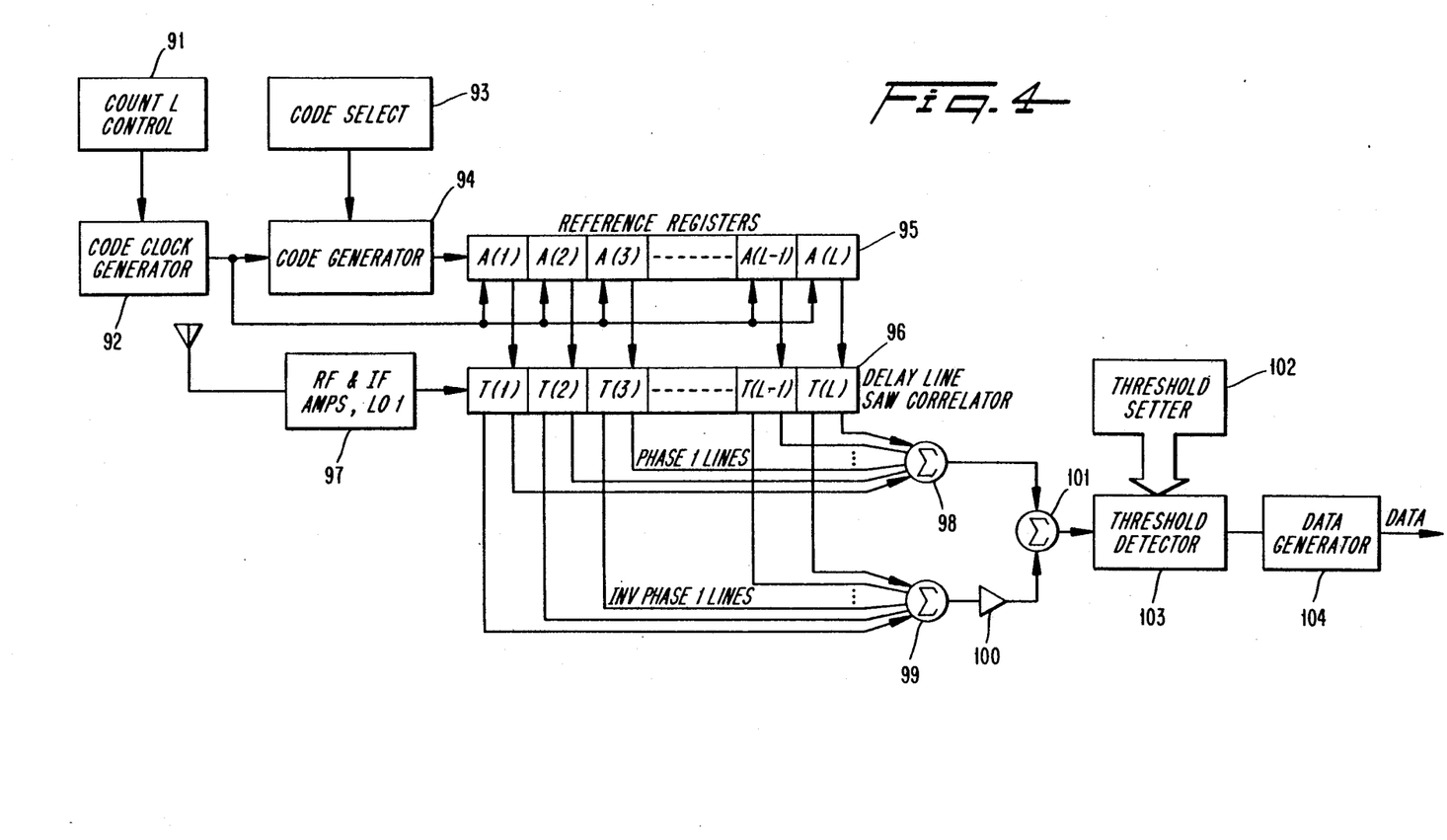
FIG. 4 illustrates one embodiment of an analog correlator based receiver according to the present invention.

When a signal with a PN code, PSK modulation, and RF frequency equivalent to that in the SAW correlator is received, then the received signal is amplified (and maybe down-converted, although down conversion to an IF frequency is not preferred unless necessary) and fed to delay line correlator 96. As the wave propagates across the surface of the correlator, the energy in each delay element increases by a factor determined by the phase of the reference elements versus the received signal phase. When the propagated wave reaches the end of the delay line, all the phase shifts match, and a maximum correlation energy is attained. The outputs of each element are summed in summers 98, 99, and the output of summer 99 is inverted in phase inverter 100 so that both sets have a common phase. The outputs are then combined in a summing device 101 so that a total sum, the correlation signal, is produced. This signal is then fed to a threshold detector 103 whose threshold has been determined by threshold setter 102, and if the correlation pulse exceeds the set threshold level, then the output signal is fed to the receive data generator 104 and processed as a first data symbol. Self-clocking data generator 104 is reset upon receipt of each first data symbol correlation signal to resynchronize its data clock with the data symbols it produces. Data generator 104 produces second data symbols unless the set threshold level is exceeded by the first data symbol correlation signal.

Figure 5:
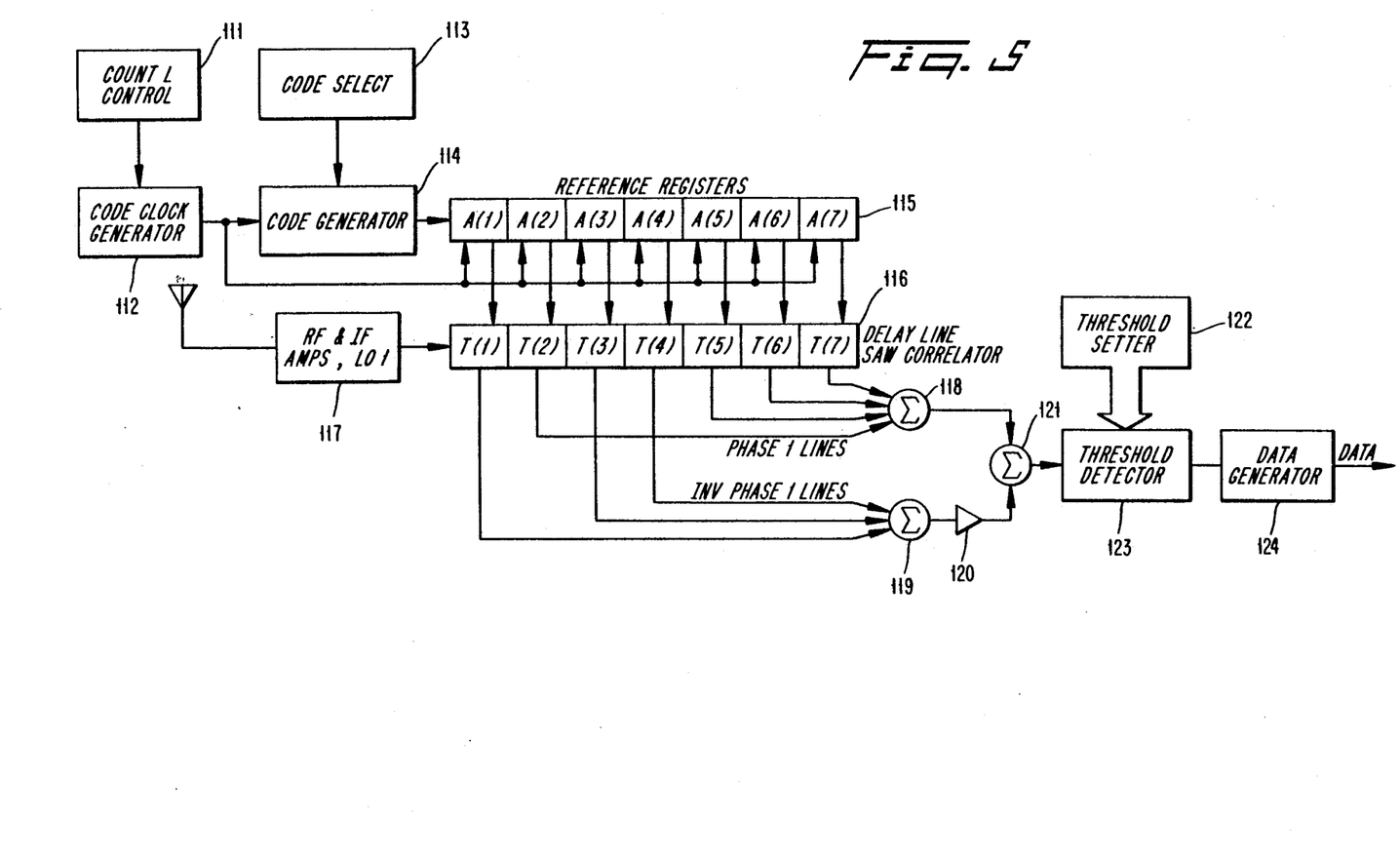
FIG. 5 illustrates an example of the analog correlator based receiver shown in FIG. 4.

As an example, consider FIG. 5. Assume that the code sequence to be correlated is 1110010, so correlator 116 must be loaded with a phase shifted reference corresponding to that code sequence. This can be accomplished through a programmable correlator using count control 111, code clock generator 112, code selector 113, code generator 114, and reference registers 115, or "hard-wired" at the factory as a nonprogrammable device.

Once the reference code has phase shifted the delay elements of correlator 116, the receive signal propagates down the delay line until the first chip is in delay element T7, the second chip is in delay element T6, and so on. When all delay elements are filled and the signal-modulating code corresponds to the filter delay elements, the signal phase in T2 is the same as that in T5, T6, and T7, and delay elements T1, T3, and T4 contain the same opposite signal phase. Summing the common phase set (T2, T5, T6, T7) separately with summer 118, the inverted phase set with summer 119, inverting with inverter 120 the summed phase reversed set (T1, T3, T4) of summer 119, and summing with summer 121 the outputs from summers 118 and inverter 120, the signal energy contained in all seven delay elements adds in phase and the total output level is seven times greater than the unprocessed signal level. This correlation pulse can then be processed as a data symbol through threshold detector 123 and data generator 124.

A difference between the method and apparatus of this invention and those used in the prior art is that the correlation pulse is used to directly derive the data symbols, while other systems may use the pulse for synchronizing a much longer reference code signal to the incoming received code signal.

A difference between SAW devices and digital correlators is in the frequency bands in which they are used. The SAW devices are usually employed at IF, but they can be used at RF. The digital correlators are usually used at baseband. Another difference is that SAW devices perform phase shift comparisons while the digital correlators perform voltage level comparisons. Further, the SAW devices sum the outputs differently from that of digital correlators. Also, when the present invention is realized with a SAW correlator, no receive code clock is required to correlate the PN code. The present invention, using a SAW correlator, may be realized using fewer components.

The present invention further includes a method using a correlator for decoding a received spread spectrum signal, which includes a data signal modulated with a PN code and PSK modulated with an RF carrier to produce a spread spectrum RF signal. The method comprises the steps, using the correlator, of generating a threshold level using threshold means, storing a pseudo-noise signal in reference-sequence-storage means, storing the received spread spectrum signal in receive-sequence-storage means, correlating the received spread spectrum signal with the pseudo-noise signal to generate a correlation signal, comparing the correlation signal to a threshold level, and generating a first data symbol in response to the correlation signal being greater than the threshold level.

This particular embodiment finds application in digital transmissions where a probabilistic estimate of correctly identifying every data bit is acceptable, or a high error rate is acceptable. Such applications would include but not be limit ed to, most audio, voice, image, and video applications and those where the predictability of the pattern of data is high even without correlation, for example, systems which only require the detection of a pulse or changes to an otherwise continuous or predictable stream of data symbols.

It will be apparent to those skilled in the art that various modifications can be made to the asymmetric spread spectrum correlator for decoding a received spread spectrum signal, which includes a data signal modulated with a PN code, of the instant invention without departing from the scope or spirit of the invention, and it is intended that the present invention cover modifications and variations of the asymmetric spread spectrum correlator provided they come within the scope of the appended claims and their equivalents.

We claim:

1. An apparatus for decoding a received spread spectrum signal having a data signal modulated with a PN code, comprising:
    threshold setting means for analyzing the pattern and application of the data signal, noise environment, and amount of error correction, and determining a threshold level;
    reference-sequence-storage means for storing a reference pseudo-noise signal;
    receive-sequence-storage means for storing the received spread spectrum signal;
    chip-comparison means coupled to said reference-sequence-storage means and said receive-sequence-storage means, and responsive to the received spread spectrum signal for comparing each chip of the received spread spectrum signal with each respective chip of the reference pseudo-noise signal to generate a plurality of chip-comparison signals;
    summer means coupled to said chip-comparison means and responsive to the plurality of chip-comparison signals for adding the plurality of chip-comparison signals to generate a correlation signal; and
    correlation-comparison means coupled to said summer means and responsive to the correlation signal being greater than the threshold level for generating a first data symbol, and for generating a second data symbol in response to the correlation signal not being greater than the threshold level.

2. The apparatus as set forth in claim 1 wherein said reference-sequence-storage means and said receive-sequence-storage means includes a surface-acoustic-wave device.

3. The apparatus as set forth in claim 2 wherein said surface-acoustic-wave device includes said chip-comparison means and said summer means.

4. An apparatus for demodulating a received spread spectrum signal having a data signal modulated with a PN code, comprising:
    threshold setting means for analyzing the pattern and application of the data signal and determining a threshold level;
    reference-sequence-storage means for storing a reference pseudo-noise signal;
    receive-sequence-storage means for storing the received spread spectrum signal;
    chip-comparison means coupled to said reference-sequence-storage means and said receive-sequence-storage means, and responsive to the received spread spectrum signal for comparing each chip of the received spread spectrum signal with each respective chip of the reference pseudo-noise signal to generate a plurality of chip-comparison signals;
    summer means coupled to said chip-comparison means and responsive to the plurality of chip-comparison signals for adding the plurality of chip-comparison signals to generate a correlation signal; and correlation-comparison means, coupled to said threshold setting means, and responsive to the correlation signal being greater than the threshold level for generating a first data-symbol signal.

5. The apparatus as set forth in claim 4 wherein said reference-sequence-storage means and said receive-sequence-storage means includes a surface-acoustic-wave device.

6. The apparatus as set forth in claim 5 wherein said surface-acoustic-wave device includes said chip-comparison means and said summer means.

7. An apparatus for decoding a received spread spectrum signal having a data signal modulated with a PN code, comprising:
threshold setting means for setting a threshold level;
reference-sequence-storage means for storing a reference pseudo-noise signal;
receive-sequence-storage means for storing the received spread spectrum signal;
chip-comparison means for comparing each chip of the received spread spectrum signal with each respective chip of the reference pseudo-noise signal to generate a plurality of chip-comparison signals;
summer means for adding the plurality of chip-comparison signals to generate a correlation signal; and
correlation-comparison means responsive to the correlation signal being greater than the threshold level for generating a first data-symbol signal.

8. The apparatus as set forth in claim 7 wherein said reference-sequence-storage means and said receive-sequence-storage means include a surface-acoustic-wave device.

9. The apparatus as set forth in claim 8 wherein said surface-acoustic-wave device includes said chip-comparison means and said summer means.

10. An apparatus for decoding a received spread spectrum signal having a data signal modulated with a PN code, comprising:
threshold setting means for analyzing the pattern and application of the data signal, noise environment, and amount of error correction, and determining a threshold level;
means for repetitively generating a plurality of reference pseudo-noise signals;
reference-sequence-storage means for storing one of the reference pseudo-noise signals;
receive-sequence-storage means for storing the received spread spectrum signal;
chip-comparison means coupled to said reference-sequence-storage means and said receive-sequence-storage means, and responsive to the received spread spectrum signal for comparing each chip of the received spread spectrum signal with each respective chip of the reference pseudo-noise signal to generate a plurality of chip-comparison signals;
summer means coupled to said chip-comparison means and responsive to the plurality of chip-comparison signals for adding the plurality of chip-comparison signals to generate a correlation signal; and
correlation-comparison means coupled to and said summer means and responsive to the correlation signal being greater than the threshold level for generating a first data symbol, and for generating a second data symbol in response to the correlation signal not being greater than the threshold level.

11. The apparatus as set forth in claim 10 wherein said reference-sequence-storage means and said receive-sequence-storage means includes a surface-acoustic-wave device.

12. The apparatus as set forth in claim 11 wherein said surface-acoustic-wave device includes said chip-comparison means and said summer means.

13. A method using a correlator for decoding a received spread spectrum signal having a data signal modulated with a PN code, comprising the steps, using said correlator, of:
determining a threshold level;
storing a reference pseudo-noise signal;
storing the received spread spectrum signal;
comparing each chip of the received spread spectrum signal with each respective chip of the reference pseudo-noise signal to generate a plurality of chip-comparison signals;
adding the plurality of chip-comparison signals to generate a correlation signal; and
generating a first data symbol in response to the correlation signal being greater than the threshold level.

14. A method using a correlator for decoding a received spread spectrum signal having a data signal modulated with a PN code, comprising the steps, using said correlator, of:
determining a threshold level;
generating repetitively a plurality of reference pseudo-noise signals;
storing one of the reference pseudo-noise signals;
storing the received spread spectrum signal;
comparing each chip of the received spread spectrum signal with each respective chip of the reference pseudo-noise signal to generate a plurality of chip-comparison signals;
adding the plurality of chip-comparison signals to generate a correlation signal; and
generating a first data symbol in response to the correlation signal being greater than the threshold level.

15. A method, using a correlator, for decoding a received spread spectrum signal having a data signal modulated using a PN code, comprising the steps of:
determining a detection threshold level;
generating a correlation signal representing the degree of match between the received spread spectrum signal and a reference pseudo-noise signal corresponding to said PN code; and
generating, at selected clock times, a first data symbol dependent upon a comparison of said correlation signal and said threshold level, and a second data symbol at said clock times when said first data symbol is not generated.

16. An apparatus, using a correlator, for decoding a received spread spectrum signal having a data signal modulated using a PN code, comprising:
means for determining a detection threshold level;
means for generating a correlation signal representing the degree of match between the received spread spectrum signal and a reference pseudo-noise signal corresponding to said PN code; and
means for generating, at selected clock times, a first data symbol signal dependent upon a comparison of said correlation signal and said threshold level, and a second data symbol signal at said clock times when said first data symbol is not generated.

* * * * *